US012575561B2

(12) United States Patent
Skinner et al.

(10) Patent No.: US 12,575,561 B2
(45) Date of Patent: Mar. 17, 2026

(54) ORGAN SUPPORT AND TEMPERATURE CONTROL DEVICE

(71) Applicants: Thomas Andrew Alexander Skinner, Halifax (CA); Ali Dergham, Ottawa (CA); Luke Witherspoon, Ottawa (CA)

(72) Inventors: Thomas Andrew Alexander Skinner, Halifax (CA); Ali Dergham, Ottawa (CA); Luke Witherspoon, Ottawa (CA)

( * ) Notice: Subject to any disclaimer, the term of this patent is extended or adjusted under 35 U.S.C. 154(b) by 938 days.

(21) Appl. No.: 17/236,613

(22) Filed: Apr. 21, 2021

(65) Prior Publication Data
US 2021/0329909 A1 Oct. 28, 2021

Related U.S. Application Data

(60) Provisional application No. 63/013,691, filed on Apr. 22, 2020.

(51) Int. Cl.
A01N 1/162 (2025.01)

(52) U.S. Cl.
CPC .................................... A01N 1/162 (2025.01)

(58) Field of Classification Search
None
See application file for complete search history.

(56) References Cited

U.S. PATENT DOCUMENTS

| | | | | | |
|---|---|---|---|---|---|
| 1,224,862 | A | * | 5/1917 | Barker | A61F 7/02 165/46 |
| 1,896,953 | A | * | 2/1933 | Hassell | A61F 7/10 126/210 |
| 2,982,841 | A | * | 5/1961 | Maccracken | A61F 7/02 165/104.31 |
| 3,091,242 | A | * | 5/1963 | Johnson, Jr. | A61M 19/00 607/105 |
| 3,238,944 | A | * | 3/1966 | Hirschhorn | F25B 21/02 607/105 |

(Continued)

FOREIGN PATENT DOCUMENTS

| | | | | | |
|---|---|---|---|---|---|
| EP | 1864619 | | 7/2010 | | |
| WO | WO-9110414 A | * | 7/1991 | | A61F 7/00 |

OTHER PUBLICATIONS

Britannica Online Encyclopedia ("Young's Modulus") Jan. 5, 2024 (Year: 2024).*

(Continued)

*Primary Examiner* — Michael A Marcheschi
*Assistant Examiner* — Nathan G Esperon
(74) *Attorney, Agent, or Firm* — F. CHAU & ASSOCIATES, LLC

(57) ABSTRACT

The present disclosure provides an organ supporting device and a manufacturing system thereof. The organ supporting device includes a tube with a one or more bends to create two supporting regions for an organ. The supporting regions are connected via a connecting region. The tube is supplied with temperature control material, such as a cooling fluid, by a circulation component. The temperature of the organ and fluid are sensed by one or more sensors and the sensed temperatures are provided to a temperature control unit to increase or decrease the temperature of the temperature control material to maintain a temperature of an organ for in-vivo or ex-vivo surgical procedures.

16 Claims, 7 Drawing Sheets

(56) References Cited

U.S. PATENT DOCUMENTS

| | | | | | |
|---|---|---|---|---|---|
| 4,154,245 | A | * | 5/1979 | Daily | A61F 7/10 |
| | | | | | 607/105 |
| 4,170,998 | A | * | 10/1979 | Sauder | F25B 41/20 |
| | | | | | 607/104 |
| 4,971,056 | A | * | 11/1990 | Seacord | A61F 7/10 |
| | | | | | 607/104 |
| 5,014,695 | A | | 5/1991 | Benak et al. | |
| 5,507,792 | A | * | 4/1996 | Mason | A61F 5/05816 |
| | | | | | 607/104 |
| 5,755,275 | A | * | 5/1998 | Rose | A61F 7/02 |
| | | | | | 607/104 |
| 6,972,028 | B2 | | 12/2005 | Chin | |
| 9,170,059 | B2 | | 10/2015 | Johnson et al. | |
| 2001/0025191 | A1 | * | 9/2001 | Montgomery | A01N 1/02 |
| | | | | | 607/104 |
| 2004/0058432 | A1 | * | 3/2004 | Owen | A01N 1/0273 |
| | | | | | 435/284.1 |
| 2004/0170950 | A1 | * | 9/2004 | Prien | A01N 1/0247 |
| | | | | | 435/284.1 |
| 2005/0065581 | A1 | * | 3/2005 | Fletcher | F28F 3/12 |
| | | | | | 607/104 |
| 2008/0008987 | A1 | * | 1/2008 | Bianco | A01N 1/144 |
| | | | | | 604/113 |
| 2008/0286746 | A1 | * | 11/2008 | Poo | A01N 1/02 |
| | | | | | 435/284.1 |
| 2009/0291486 | A1 | * | 11/2009 | Wenrich | A01N 1/0247 |
| | | | | | 435/284.1 |
| 2012/0288848 | A1 | * | 11/2012 | Latham | A61F 7/02 |
| | | | | | 604/113 |
| 2013/0296982 | A1 | * | 11/2013 | Feng | A61F 7/12 |
| | | | | | 607/105 |

OTHER PUBLICATIONS

Britannica Online Encyclopedia ("thermal conductivity") Jan. 14, 2024 (Year: 2024).*

* cited by examiner

115

120

105

100

305

315

First Direction

Second Direction

335

330

325

300

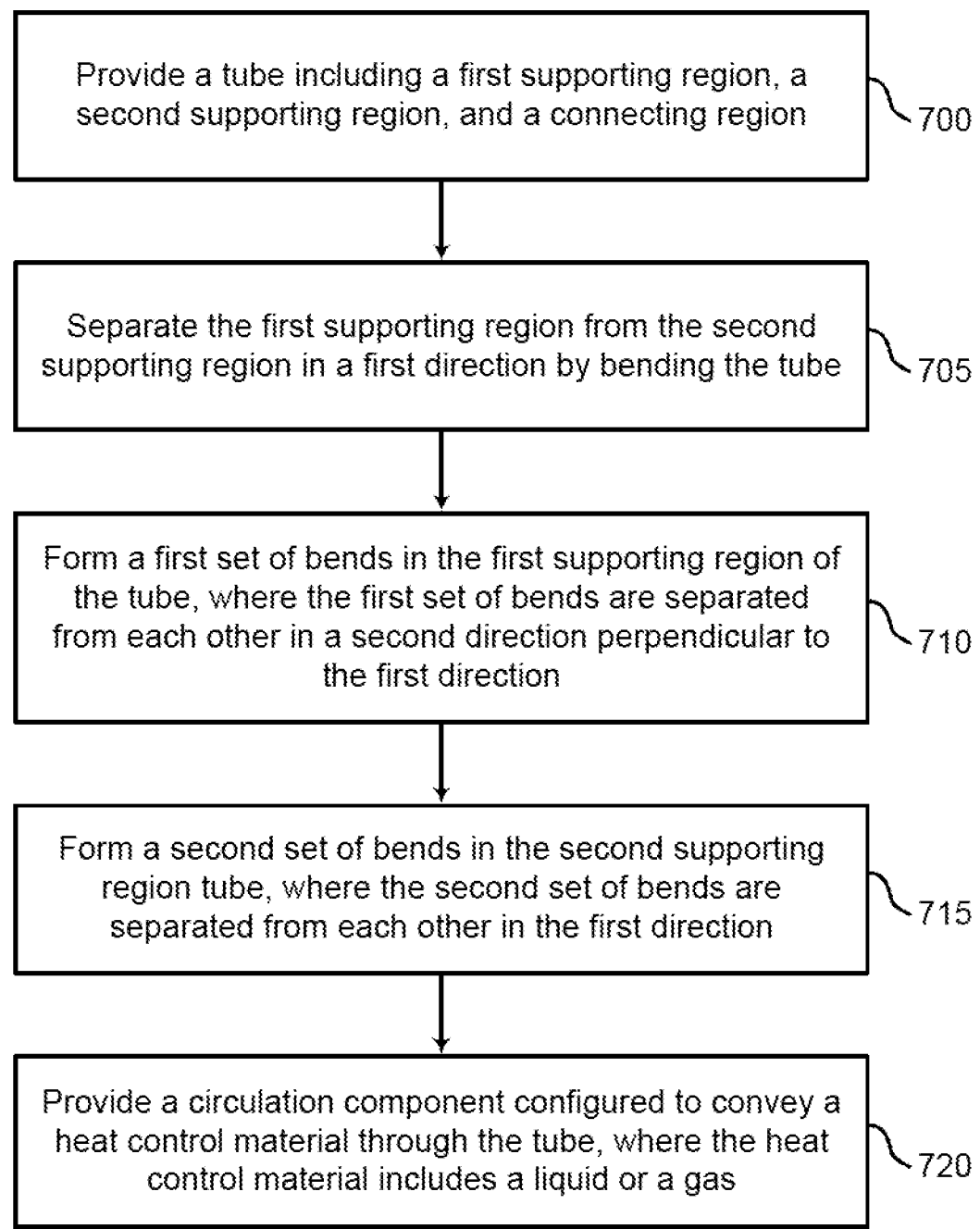

Provide a tube including a first supporting region, a second supporting region, and a connecting region ⟋700

Separate the first supporting region from the second supporting region in a first direction by bending the tube ⟋705

Form a first set of bends in the first supporting region of the tube, where the first set of bends are separated from each other in a second direction perpendicular to the first direction ⟋710

Form a second set of bends in the second supporting region tube, where the second set of bends are separated from each other in the first direction ⟋715

Provide a circulation component configured to convey a heat control material through the tube, where the heat control material includes a liquid or a gas ⟋720

FIG. 7

ORGAN SUPPORT AND TEMPERATURE CONTROL DEVICE

CROSS-REFERENCE TO RELATED APPLICATION

This application claims priority to, and the benefit of, U.S. Provisional Application Ser. No. 63/013,691 filed on Apr. 22, 2020. The entire contents of the foregoing application are hereby incorporated by reference for all purposes.

BACKGROUND

The following relates generally to medical devices, and more specifically to organ temperature control.

Many medical interventions depend on extracting an organ from the body, modifying or transporting the extracted organ, and then re-implanting the organ. It is important to control the temperature of the organ during every phase of such procedures to prevent complications. If the temperature of an organ is not precisely maintained, permanent damage may occur, rendering the organ useless.

However, systems for maintaining the temperature of an organ are not suitable for use during an operation. For example, a temperature-controlled transportation unit may not provide easy visibility or access to portions of the organ that are being operated on. Additionally, some temperature control units provide inferior or variable temperature control.

As a result, conventional techniques for controlling the temperature of an organ do not provide the capability for regulating the temperature of the organ during operation or re-implantation. This limits the amount of time available to operate on the organ and increases the likelihood of organ failure. Therefore, there is a need in the art for improved systems and methods for regulating the temperature of an organ during extraction and or re-implantation.

SUMMARY

The present disclosure describes systems and methods for supporting an organ and controlling or maintaining the temperature of the organ for in-vivo or ex-vivo surgical procedures. Some embodiments of the present disclosure include a semi-rigid tube with a set of bends used to support the organ. The tube is supplied with fluid to control the temperature of the organ. The fluid may be circulated through the tube by a circulation component, and the temperature of the fluid may be controlled by one or more sensors and a temperature control unit. The one or more sensors may detect the temperature of the fluid, the organ, or both. For example, embodiments of the present disclosure maintain allograft temperatures during vascular anastomosis, thereby limiting ischemic damage, while providing support for a kidney to facilitate vascular anastomosis.

An apparatus, system, and method for organ temperature control are described. One or more embodiments of the apparatus, system, and method include a tube comprising a first supporting region, a second supporting region separated from the first supporting region in a first direction, and a connecting region connecting the first region and the second region, a first plurality of bends in the first supporting region of the tube, wherein the first plurality of bends are separated from each other in a second direction perpendicular to the first direction, a second plurality of bends in the second supporting region tube, wherein the second plurality of bends are separated from each other in the second direction, and a circulation component configured to convey a temperature control material through the tube, wherein the temperature control material comprises a liquid or a gas.

A method, apparatus, and system for organ temperature control are described. One or more embodiments of the method, apparatus, and system include supporting an organ using an organ supporting apparatus comprising a tube with a first supporting region, a second supporting region separated from the first supporting region in a first direction, and a connecting region connecting the first region and the second region, wherein the tube comprises a first plurality of bends in the first supporting region of the tube, wherein the first plurality of bends are separated from each other in a second direction perpendicular to the first direction, and wherein the tube comprises a second plurality of bends in the second supporting region tube, wherein the second plurality of bends are separated from each other in the first direction and controlling a temperature of the organ by conveying a temperature control material through the tube.

A method, apparatus, and system for organ temperature control are described. One or more embodiments of the method, apparatus, and system include providing a tube comprising a first supporting region, a second supporting region, and a connecting region, separating the first supporting region from the second supporting region in a first direction by bending the tube, forming a first plurality of bends in the first supporting region of the tube, wherein the first plurality of bends are separated from each other in a second direction perpendicular to the first direction, and forming a second plurality of bends in the second supporting region tube, wherein the second plurality of bends are separated from each other in the first direction.

BRIEF DESCRIPTION OF THE DRAWINGS

FIGS. 6 through 7 show examples of a process for organ temperature control according to aspects of the present disclosure.

DETAILED DESCRIPTION

Figure 1:
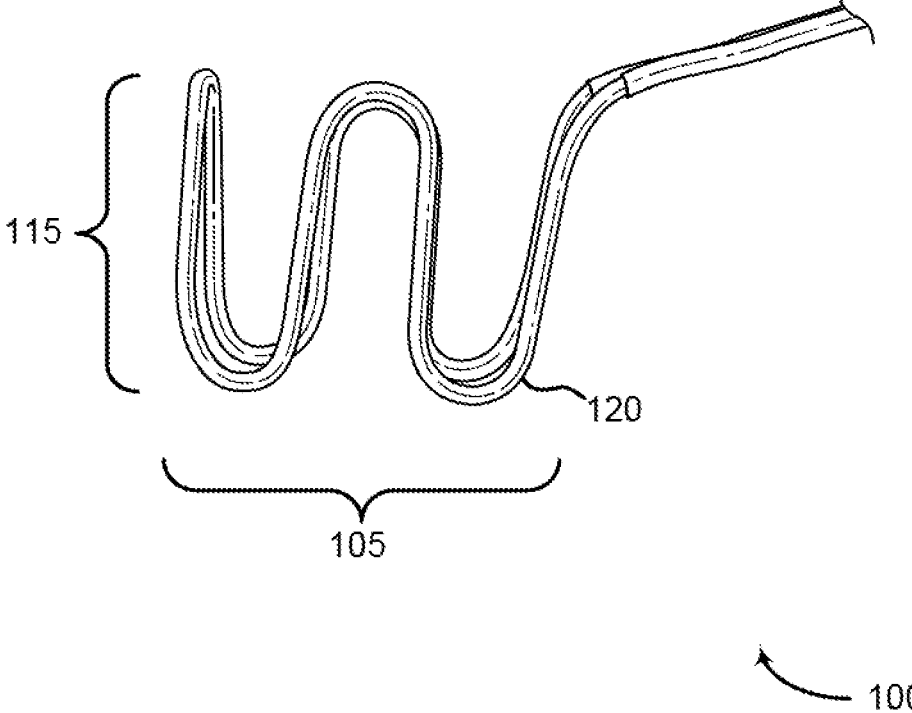
FIG. 1 shows an example of an organ supporting apparatus according to aspects of the present disclosure.

The present disclosure describes systems and methods for organ temperature control. Embodiments of the present disclosure include a tube (e.g. a tube made of a semi-rigid material such as a metal) comprising a set of bends, configured to cradle or hold an organ. The tube is filled at least in part with a circulating temperature control material to control the temperature of the organ. The temperature control material is pushed through the tube by a circulation component (e.g., using gravity or a pump) and the temperature of the temperature control material can be controlled by sensors sensing the temperature of the organ or the temperature of the fluid. In some cases, the temperature control material may be a fluid such as water, antifreeze, or saline.

Methods of maintaining organ temperature during implantation may include cooling irrigation, ice bag immersion, and the use of a cooling jacket. Surface or topical cooling techniques are among the simplest methods. These methods involve intermittent cooling or irrigation of the organ with cold saline, with some methods including wrapping the kidneys in gauze. Additionally, or alternatively, ice bag immersion techniques involve suspending the kidney in a bag containing a temperature control material such as ice slush, cold saline, or other cold preservation solution.

Cooling jackets are another device for organ cooling. Cooling jackets are devices that surround the organ and flow cool fluid through the extremities of the jacket. Cooling jackets use a shell or jacket encasing the organ and incorporate a mechanical cooling system. Though cooling jackets provide organ temperature control, they have not been used in clinical transplantation. Cooling jackets can be complex, costly to manufacture, and may employ non-biocompatible compounds to achieve cooling, leading to economic and pragmatic barriers to their adoption, particularly when evidence from human studies is yet to be available.

Furthermore, although strategies using irrigation, ice bags, or cooling jackets have been shown to be effective in controlling temperature, clinical adoption of these temperature control methods remains limited because they obscure the surgeon's view or access during the operation. Furthermore, the temperature control material may leak into the operative field, and even if well-contained, the fragile and puncturable nature of the bags can necessitate frequent re-filling, adding complexity and additional steps an operation.

Therefore, embodiments of the present disclosure are simple to use and effective in maintaining organ temperature, while facilitating access to the organ without obstructing or crowding the operative field. Embodiments of the present disclosure include a device with a tube having multiple bends, a handle, a circulation component, a temperature control unit, and a temperature sensor. In some embodiments, the tube receives a fluid to cool or heat the organ to a predetermined temperature. The predetermined temperature may be variable based on the organ being handled. The temperature sensor may sense the temperature of the organ, the fluid, or both. The temperature control unit may receive the temperature data of the organ and the fluid and adjust the temperature of the fluid. The circulation component may circulate the fluid through the tube to control the temperature of the organ.

In an example scenario, an embodiment of the present disclosure may be used to prevent damage from warm ischemia to a kidney during a transplant operation. Warm ischemia refers to the ischemic injury of cells and tissue under a normothermic conditions (i.e., damage due to inadequate blood flow). During kidney transplantation, warm ischemia time (WIT) may refer to two distinct periods; ischemia occurring in the donor from the time of vascular clamping (or asystole in the case of donation after cardiocirculatory death (DCD)) until cold perfusion, or the ischemia of rewarming during vascular anastomosis, occurring from the time of removal from ice until reperfusion.

Organ warm ischemic injury may be due to organ glomerular and tubular metabolic activity. In an example scenario of a transplant setting, the rewarming profiles of an organ may be roughly 20-30 minutes to reach a temperature threshold for sustained metabolic activity.

WIT is the period of ischemia beginning with the removal of the organ from ice and concluding at reperfusion and is associated with a generation of reactive oxygen species, immune stimulation, delayed graft function, and adverse long-term patient and graft survival. Metabolic activity in cooled kidneys is minimal at 5° C. and resumes above 15° C., a temperature reached after 15 minutes of rewarming. As a result, WIT in organ transplantation is often ≥40 min during vascular anastomosis. The solution may include maintaining organ hypothermia during the process. Although various devices have been proposed, most suffer from being too bulky, inefficient, expensive, or prone to puncture and none are currently used clinically.

WIT is associated with many adverse outcomes. An embodiment of the present disclosure comprises an organ cooling device used to reduce or maintain organ temperatures below metabolically active levels while facilitating vascular anastomoses by also acting as a retractor and device to support the allograft.

In some cases, prolonged WIT is an independent risk factor for the occurrence of poor early graft function, in addition to impaired long-term graft survival. Additionally, increased WIT may lead to an increased risk of delayed graft function (DGF) and impaired allograft function after transplantation, in addition to increased risk of interstitial fibrosis and tubular atrophy.

Prolonged WIT is associated with numerous adverse outcomes. Mitigating these outcomes lies in maintaining organ hypothermia during organ removal and vascular anastomosis. Embodiments of the present disclosure include an aluminum cooling jacket that maintains organ temperatures below metabolically active levels, while facilitating vascular anastomoses. In addition, an embodiment of the present disclosure provides ease of handling of the allograft and offers greater opportunities for trainees to acquire surgical experience, particularly in cases with challenging anatomy.

Devices such as cooling jackets may be used to cool an organ but are limited in the surgical setting. The jacket portion surrounding the organ can have variable properties, which may result in unpredictable effects on the organ. Additionally, organs may be wrapped in gauze and ice, which presents problems with proper temperature control, and moisture, and may cause complications in a surgical setting such as pieces of gauze becoming attached to an organ.

The terms 'coolant', 'cooling fluid', 'temperature control material', 'heat control fluid', and the like are used interchangeably to reference a material with heat transfer properties. For example, water, antifreeze, saline, and the like have preferential heat transfer properties, but the present disclosure is not limited thereto, and other temperature control materials may be used.

Accordingly, methods, apparatus, and systems for organ temperature control are described. One or more embodiments of the method, apparatus, and system include supporting an organ using an organ supporting apparatus comprising a tube with a first supporting region, a second supporting region separated from the first supporting region in a first direction, and a connecting region connecting the first region and the second region, wherein the tube comprises a first plurality of bends in the first supporting region of the tube, wherein the first plurality of bends are separated from each other in a second direction perpendicular to the first direction, and wherein the tube comprises a second plurality of bends in the second supporting region tube, wherein the second plurality of bends are separated from each other in the first direction and controlling a temperature of the organ by conveying a temperature control material through the tube.

Some examples of the method, apparatus, and system described above further include sensing the temperature of the organ. Some examples further include adjusting a flow of the temperature control material based on the temperature. Some examples of the method, apparatus, and system described above further include heating the temperature control material, wherein controlling the temperature of the organ comprises increasing the temperature of the organ.

Some examples of the method, apparatus, and system described above further include cooling the temperature control material, wherein controlling the temperature of the organ comprises decreasing the temperature of the organ. Some examples of the method, apparatus, and system described above further include manipulating an organ being supported by the organ supporting apparatus using a surgical retraction device.

Embodiments of the present disclosure may be used in the context of in-vivo or ex-vivo surgical organ cooling. For example, a surgeon may use the device of the present disclosure during an operation on a kidney. A donor kidney may be placed in the organ cooling device and held in place for an indeterminate amount of time before and during the surgery. Additionally, the organ cooling device may be used in standard surgical retraction components, such as a Bookwalter retractor. An example of the organ cooling device is provided with reference to FIGS. 1-4. Details regarding the organ cooling apparatus and a circulation component are provided with reference to FIG. 5. Methods for producing and using an organ cooling device are provided with reference to FIGS. 6 and 7.

FIG. 1 shows an example of an organ supporting apparatus 100 according to aspects of the present disclosure. In one embodiment, organ supporting apparatus 100 includes supporting region 105, connecting region 115, and bends 120. Organ supporting apparatus 100 is an example of, or includes aspects of, the corresponding element described with reference to FIGS. 2-5.

In some cases, the organ supporting apparatus 100 may be used as a surgical retractor and provides support for the kidney in addition to cooling. Thus, the tube may be rigid enough to support the weight of an organ without additional structural support. The bends in the tube may be configured to enable the organ supporting apparatus 100 to support an organ at multiple touch points while still allowing a temperature control material to flow through the organ supporting apparatus 100.

Accordingly, the organ supporting apparatus 100 may have sufficient rigidity as well as being a flexible material (such as a bendable metal tube) to enable it to be used as a retractor. In some cases, the organ supporting apparatus 100 can be molded to a patient's anatomy to allow it to retract the edge of the incision out of the way (e.g., at an abdominal wall). The organ supporting apparatus 100 may be formed of aluminum, steel, carbon, Teflon, plastic or any other metal or material suitable for supporting an organ while conducting temperature from the temperature control material to an organ (or vice versa).

In some embodiments, an attachment of the organ supporting apparatus 100 may connect to a retracting device (such as a Bookwalter retractor or similar type of surgical retraction device (Omni-tract, Thompson etc.) to create a hands-free component.

In some embodiments, the organ supporting apparatus 100 may include a simultaneous temperature measurement and control device. For example, a user may place a small thermocouple on or implant it within an organ for measuring temperature. The sensor may then be connected to a pump or valve that reads the organ temperature and then controls the flow of temperature control material through the organ supporting apparatus 100. In some embodiments, temperature control may be fully automated or manually controlled. In some embodiments, temperature monitoring may happen with or without control of the device and may occur continuously or intermittently.

Supporting regions 105 of the organ supporting apparatus 100 may include a collection of bends 120 used to provide support on a side of an organ during transportation or surgery. The organ supporting apparatus 100 may include a first supporting region 105 on a first side and a second supporting region 105 on a second side. The supporting regions 105 may be an example of, or includes aspects of, the corresponding elements described with reference to FIGS. 2 and 3.

The connecting region 115 is the area between a first supporting region 105 and a second supporting region 105 and connecting the first supporting region 105 and second supporting region 105 while allowing flow of the temperature control material though the regions. In some cases, the connecting region 115 may extend in a direction perpendicular to a direction in which a first supporting region 105 and a second supporting region 105 extend. The connecting region 115 may be formed of a portion of a same tube that forms the supporting regions 105. Connecting region 115 is an example of, or includes aspects of, the corresponding element described with reference to FIGS. 2 and 3.

The bend or bends 120 refer to a region of tubing where the tube changes direction. The bends 120 are used to provide more surface of the tube to hold the organ in place while allowing flow of the temperature control material through the tube.

The bends 120 may be oriented as little as 1 mm away from each other, 1 cm away from each other, or up to 20 cm away from each other, for example. In some cases, the bends 120 are produced via a manual or automated bending operation. The bends 120 may have a same radius, or a variable radius. Bends 120 are an example of, or include aspects of, the corresponding elements described with reference to FIGS. 2 and 3.

Figure 2:
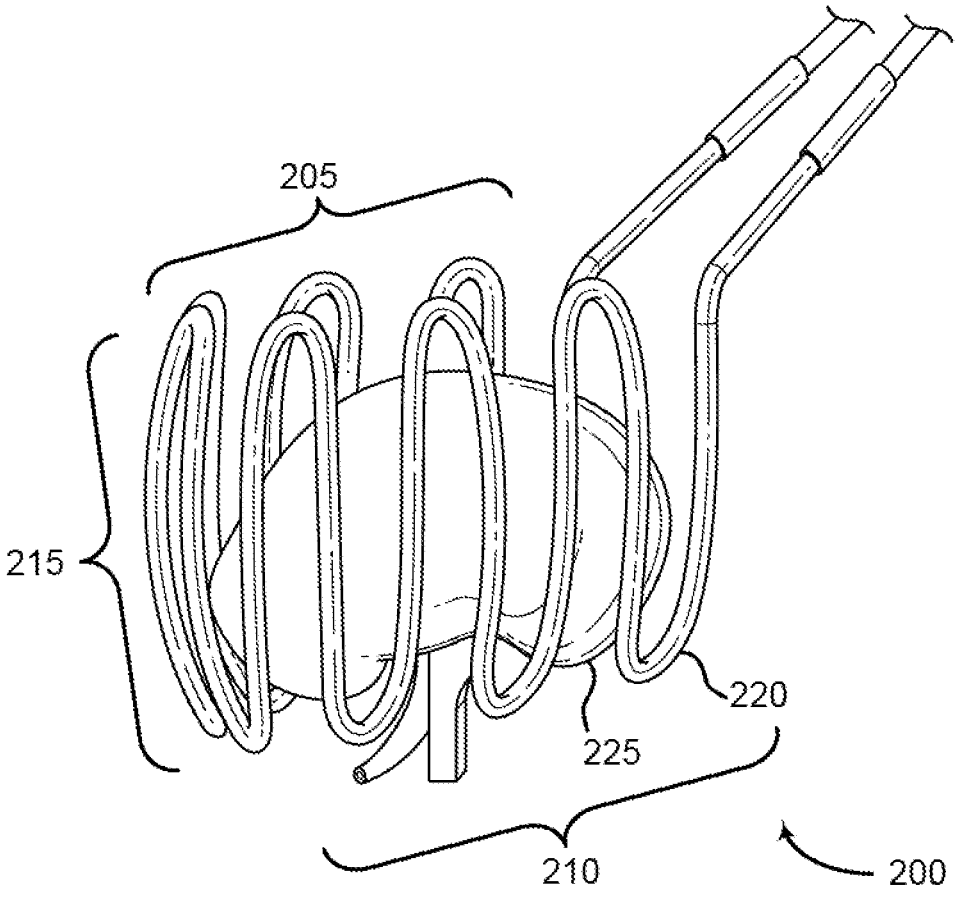
FIG. 2 shows an example of an organ supporting apparatus with an organ according to aspects of the present disclosure.

FIG. 2 shows an example of an organ supporting apparatus 200 with an organ 225 according to aspects of the present disclosure. Organ supporting apparatus 200 is an example of, or includes aspects of, the corresponding element described with reference to FIGS. 1, and 3-5. In one embodiment, organ supporting apparatus 200 includes first supporting region 205, second supporting region 210, connecting region 215, bends 220, and organ 225.

The first supporting region 205 is configured to support an organ 225 on at least a first side of the organ 225 and a second supporting region 210 is configured to support an organ 225 on at least another side of the organ 225, opposite of the first supporting region 205 in a first direction. First supporting region 205 and second supporting region 210 are examples of, or includes aspects of, the corresponding element described with reference to FIGS. 1 and 3.

The connecting region 215 is the area between the first and second supporting region, connecting the first and second supporting regions. In some cases, the connecting region 215 may separate the first supporting region 205 and the second supporting region 210 in a first direction, while the first supporting region 205 and the second supporting region 210 may extend in a second direction perpendicular to the first direction. Although the first supporting region 205 and the second supporting region 210 extend in the second direction, they may also extend somewhat in the first direction (and in a third direction—a vertical direction—that is perpendicular to the first direction and the second direction). Similarly, the connecting region 215 may extend somewhat in the second direction. For example, the first supporting region 205 and the second supporting region 210 and the connecting region 215 may each be rounded or bent.

In some cases, a portion of the tube within the first supporting region 205 and the second supporting region 210 may extend in a third direction perpendicular to both the first direction and the second direction (e.g., a vertical direction). Connecting region 215 is an example of, or includes aspects of, the corresponding element described with reference to FIGS. 1 and 3.

The bend or bends 220 may include an adjacently oriented region of tubing used to hold the organ in place. The bends 220 may be oriented 1 mm away from each other, 1 cm away from each other, or up to 20 cm away from each other. In some cases, the bends 220 are produced via a bending operation and may include a constant radius or a variable radius bends. In some cases, the bends 220 may be squared. Bends 220 is an example of, or includes aspects of, the corresponding element described with reference to FIGS. 1 and 3.

The organ 225 may be any human or animal organ suitable for transplant from a donor to a host. For example, the organ 225 may be a kidney, heart, liver, lung, or the like. In some cases, the organ 225 may be removed from a donor and imminently placed into the organ supporting apparatus for suitable maintenance of temperature. In some embodiments, organ supporting apparatus 200 is used while the organ 225 is still inside a donor to keep organ 225 cold while surgeons extract the organ 225. Organ 225 is an example of, or includes aspects of, the corresponding element described with reference to FIGS. 3-5.

Figure 3:
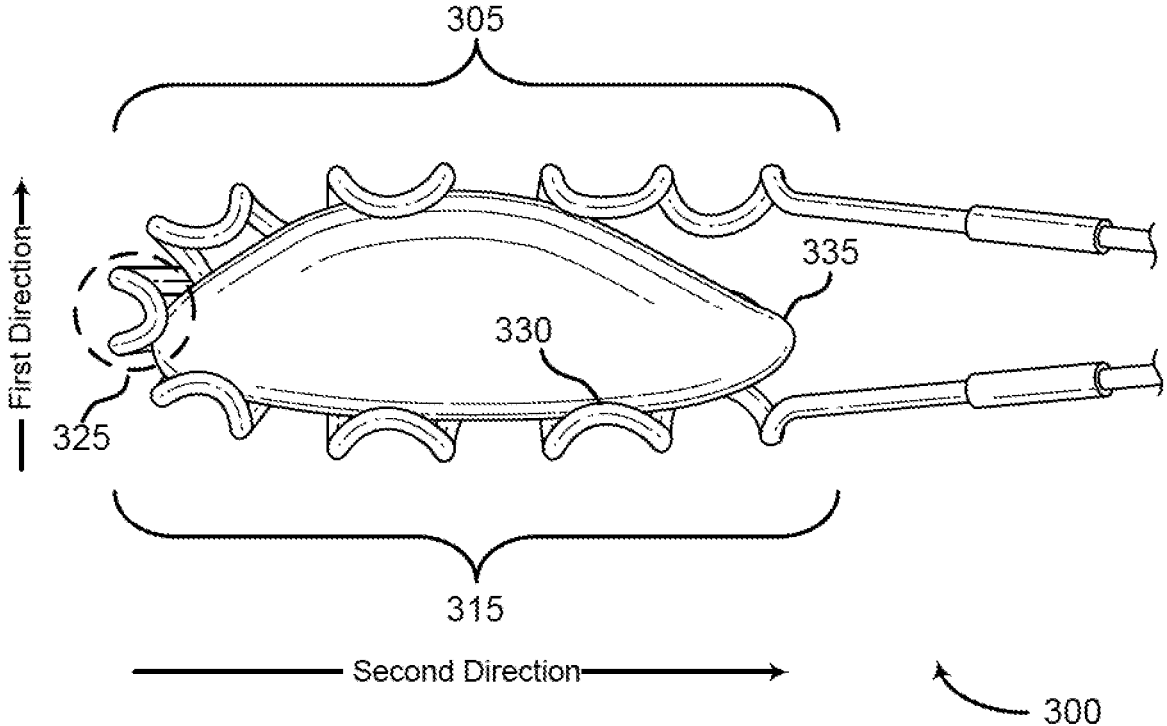
FIG. 3 shows an example of a top view of an organ supporting apparatus with an organ according to aspects of the present disclosure.

FIG. 3 shows an example of a top view of an organ supporting apparatus 300 with an organ 335 according to aspects of the present disclosure. Organ supporting apparatus 300 is an example of, or includes aspects of, the corresponding element described with reference to FIGS. 1, 2, 4, and 5. In one embodiment, organ supporting apparatus 300 includes first supporting region 305, second supporting region 315, connecting region 325, bends 330, and organ 335. Also shown are a first direction and a second direction.

The first supporting region 305 is configured to support an organ on at least a first side of the organ and a second supporting region 305 is configured to support an organ on at least another first side of the organ, opposite of the first supporting region 305. First supporting region 305 and second supporting region 315 are examples of, or includes aspects of, the corresponding element described with reference to FIGS. 1 and 2.

In one embodiment, the first supporting region 305 includes first direction 310 and the second supporting region 315 includes second direction 320. First direction 310 and second direction 320 are relative to each other. The first direction may oppose the second direction and the second direction may oppose the first direction. The first and second directions may be generally coplanar or parallel to each other.

Connecting region 325 is the area between the first and second supporting region, connecting the first and second supporting regions. In some cases, the connecting region 325 may be generally oriented in a direction perpendicular to a direction of extension of the first supporting region, second supporting region, or both. Connecting region 325 is an example of, or includes aspects of, the corresponding element described with reference to FIGS. 1 and 2.

The bend or bends 330 is an adjacently oriented region of tubing used to hold the organ in place. The bends 330 may be oriented 1 mm away from each other, 1 cm away from each other, or up to 20 cm away from each other. In some cases, the bends 330 are produced via a bending operation and may include a constant radius or a variable radius bends. In some cases, the bends 330 may be squared. Bends 330 is an example of, or includes aspects of, the corresponding element described with reference to FIGS. 1 and 2.

The organ 335 may be any human, animal, or synthetic organ suitable for operation or transplant (e.g., from a donor to a host). For example, the organ 335 may be a kidney, heart, liver, lung, or the like. In some cases, the organ 335 may be removed from a donor and imminently placed into the organ supporting apparatus for suitable maintenance of temperature. Organ 335 is an example of, or includes aspects of, the corresponding element described with reference to FIGS. 2, 4, and 5.

Figure 4:
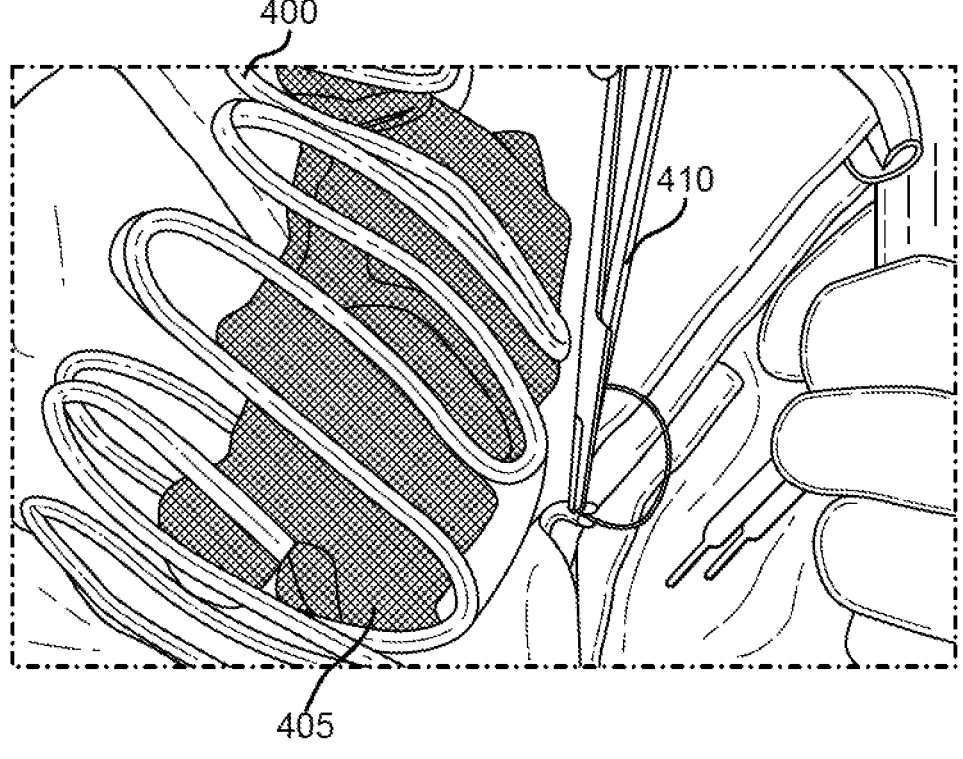
FIG. 4 shows an example of an organ supporting apparatus during a surgical operation according to aspects of the present disclosure.

FIG. 4 shows an example of an organ supporting apparatus 400 during a surgical operation according to aspects of the present disclosure. The example shown includes organ supporting apparatus 400, organ 405, and surgical instrument 410. Organ supporting apparatus 400 is an example of, or includes aspects of, the corresponding element described with reference to FIGS. 1-3, and 5. In the example shown, a flexible material surrounds the organ, but the present disclosure is not limited thereto. In some examples, the organ supporting apparatus 400 may be in direct contact with an organ without any cloth or gauze wrapping or pouch. However, in some cases, a disposable wrapping may be attached to either the organ or the organ supporting apparatus 400.

The organ 405 may be any human or animal organ suitable for transplant from a donor to a host. For example, the organ 405 may be a kidney, heart, liver, lung, or the like. In some cases, the organ 405 may be removed from a donor and imminently placed into the organ supporting apparatus for suitable maintenance of temperature. Organ 405 is an example of, or includes aspects of, the corresponding element described with reference to FIGS. 2, 3, and 5.

The surgical instrument 410 may be a scalpel, scissors, forceps, clamps, needles, retractors, or the like. In some cases, the surgical instrument 410 may be any device used during a surgical procedure to assist the surgical team in removing or replacing and organ from a donor to a host.

An apparatus, system, and method for organ temperature control are described. One or more embodiments of the apparatus, system, and method include a tube comprising a first supporting region, a second supporting region separated from the first supporting region in a first direction, and a connecting region connecting the first region and the second region, a first plurality of bends in the first supporting region of the tube, wherein the first plurality of bends are separated from each other in a second direction perpendicular to the first direction, a second plurality of bends in the second supporting region tube, wherein the second plurality of bends are separated from each other in the second direction, and a circulation component configured to convey a temperature control material through the tube, wherein the temperature control material comprises a liquid or a gas.

In some examples, the first supporting region and the second supporting region are configured to support an organ between the first supporting region and the second supporting region when the first supporting region and the second supporting region are pressed together in the first direction.

In some examples, the circulation component comprises an elevated reservoir for the temperature control material, wherein the temperature control material is drawn through the tube by gravity. Additionally, or alternatively, the circulation component comprises a pump.

Some examples of the apparatus, system, and method described above further include a handle region of the tube configured to support a weight of the first supporting region and the second supporting region and to convey a force pressing the first supporting region and the second supporting region together in the first direction. The handle region may be used by the user to grasp the organ supporting apparatus. In some embodiments, a handle can also be used to connect to a hands-free surgical retractor system such as a Bookwalter, etc. In some cases, the handle may be plastic, wood, metal, or the like. The handle may be machined, cast, or injection molded, but the present disclosure is not limited thereto.

In some examples, the tube is formed from a material having a Young's modulus greater than 10 GPa and is formed from a material with a thermal conductivity of greater than 0.1 W/mK. In some examples, the tube is configured to hold an organ without additional supporting material.

In some examples, the organ supporting apparatus is configured to provide visibility between the first plurality of bends to an organ being supported by the organ supporting apparatus.

Some examples of the apparatus, system, and method described above further include a temperature control unit configured to control the temperature of an organ by cooling or heating the temperature control material, or by controlling a flow rate of the temperature control material.

Some examples of the apparatus, system, and method described above further include a temperature sensor configured to sense a temperature of the temperature control material, a temperature of an organ, or both. Additionally, or alternatively, embodiments of the present disclosure provide a surgical retraction device configured to retract, advance or manipulate the organ supporting apparatus within a surgical area.

The device of the present disclosure assists in facilitating rather than impairs the surgical process. By utilizing a semi-rigid material, an embodiment of the present disclosure is that it acts as a surgical retractor and can provide hands-free operation. Additionally, or alternatively, the device of the present disclosure may attach to a Bookwalter retractor or other similar retractors. The device of the present disclosure may integrate into the operative environment. Therefore, in addition to retracting, advancing, and manipulating the organ; the device of the present disclosure may retract, advance or manipulate surrounding tissues within the surgical area to improve visibility and working space within the surgical field.

The use of the organ supporting apparatus of the present disclosure provides rapid vascular anastomosis times and does not add any appreciated bulkiness or view obstruction. Additionally, or alternatively, the low profile and grasping/ungrasping function provided easier handling of allograft when compared to the commonly employed umbilical tape method. The malleable tube with a dedicated and insulted handle enables handling, positioning, grasping, and ungrasping of the allograft.

Figure 5:
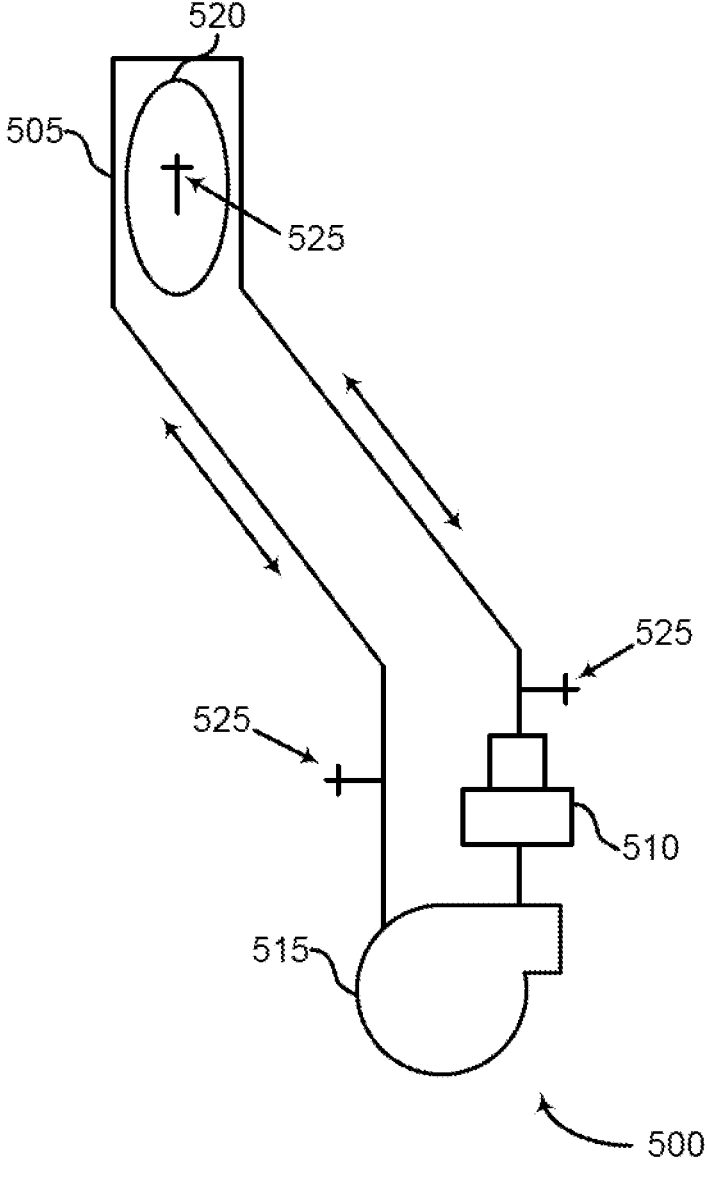
FIG. 5 shows an example of a schematic for an organ supporting apparatus with a circulation component according to aspects of the present disclosure.

FIG. 5 shows an example of a schematic for an organ supporting apparatus 500 with a circulation component 515 according to aspects of the present disclosure. In one embodiment, organ supporting apparatus 500 includes tube 505, temperature control unit 510, circulation component 515, organ 520, and one or more temperature sensors 525. Organ supporting apparatus 500 is an example of, or includes aspects of, the corresponding element described with reference to FIGS. 1-4.

The device may be comprised of aluminum tubing, which may be organized in a serpentine pattern to create a malleable, form-fitting cooling jacket around the organ. The organ supporting apparatus 500 may provide stable surface and core temperatures for prolonged periods of time. Additionally, or alternatively, the device may mitigate surface and core temperature increases. Ex-vivo vascular anastomosis testing was not inhibited or delayed by an embodiment of the present disclosure.

According to one embodiment, malleable aluminum was chosen as a material for construction due to the thermal properties of aluminum, though the present disclosure is not limited thereto and any plastic, steel, or rubber may be used. According to an embodiment of the present disclosure, the malleable aluminum tubing may be organized in a serpentine fashion using a proprietary method that limits kinking and deformities to create a form-fitting cooling jacket to encase the organ.

The single-material construction of the tube provides good heat transfer capabilities, and a malleable and formable metal was chosen for simple production and processing and for bed-side customization of the device. The bed-side customization relates to adapting the device to each unique allograft anatomy. The semi-rigid construction of the tube may be used for the retraction of surrounding tissues and structures and facilitates attachment to a retraction support device such as a Bookwalter retractor. Moreover, a single-material metal construction may be used for a variety of sterilization techniques such as autoclaving, repeated chemical sterilization, gamma irradiation, E-beam, EtOH, and the like. The tube may have a round profile, but various other profiles may be used, such as oval, octagonal, polygonal, or the like.

Some embodiments of the present disclosure maintain organ hypothermia. The device of the present disclosure is capable of maintaining uniform surface and core temperatures ≤5° C. for 60 minutes using a gravity-fed chilled saline. Saline may be used as a temperature control material, where the abrupt rewarming of an organ can be mitigated by slowly warming the saline a few moments prior to releasing the vascular clamps.

In some examples, organ supporting apparatus 500 uses special-purpose hardware. Generally, these operations may be performed according to the methods and processes described in accordance with aspects of the present disclosure. For example, the operations may be composed of various substeps, or may be performed in conjunction with other operations described herein.

The primary method of cooling involves flow of temperature control material through the tube matrix. In cases where organ rewarming is desired, a warming fluid could flow through the tube matrix. In general, throughout the present disclosure, where a temperature control material is mentioned, a warming fluid could also be used to control the temperature of an organ. In the example shown in FIG. 5, the arrows represent the flow of temperature control material through the tube 505.

The tube 505 is a single piece of semi-rigid material in which fluid may pass through. The tube 505 may be made of aluminum, steel, plastic, rubber, or the like. In a preferred embodiment, tube 505 is comprised of aluminum due to the aluminum's malleability and heat transfer properties.

In some cases, organ supporting apparatus 500 provides a set of bends or joints/connections in the semi-rigid tube, where each of the set of bends/joints/connections extends in a first direction, and where the set of bends/joints/connections are configured to support an organ on at least a first side of the organ and a second side of the organ separated from the first side in a second direction.

According to some embodiments, tube 505 is comprising a first supporting region, a second supporting region separated from the first supporting region in a first direction, and a connecting region connecting the first region and the second region. In some examples, tube 505 is, wherein the first plurality of bends are separated from each other in a second direction perpendicular to the first direction. In some examples, tube 505 is, wherein the second plurality of bends are separated from each other in the second direction. In some examples, the first supporting region and the second supporting region are configured to support an organ 520 between the first supporting region and the second supporting region when the first supporting region and the second supporting region are pressed together in the first direction.

In some examples, the tube 505 is formed from a material having a Young's modulus greater than 10 GPa. In some examples, the tube 505 is formed from a material with a thermal conductivity of greater than 0.1 W/mK. In some examples, the tube 505 is configured to hold an organ 520 without additional supporting material. In some examples, the organ supporting apparatus 500 is configured to provide visibility between the first set of bends to an organ 520 being supported by the organ supporting apparatus 500.

The temperature control unit 510 may be a cooling unit, a heating unit, or a unit for both heating or cooling the fluid. In some embodiments, temperature control unit 510 may include an insulating jacket around a pre-chilled fluid reservoir. For example, a cold bag of saline may be wrapped in an insulating material to control the temperature. In some cases, the temperature control unit 510 extracts heat energy from the fluid in the tube 505, which reduces the temperature of the fluid. In some cases, the cooling unit may be a liquid-to-liquid system, a closed-loop dry system, an open-loop evaporative system, a closed-loop evaporative system, or a chilled water system, or the like, but the present disclosure is not limited thereto. According to some embodiments, temperature control unit 510 is configured to control the temperature of an organ 520 by cooling or heating the temperature control material, or by controlling a flow rate of the temperature control material.

According to some embodiments, temperature control unit 510 controls a temperature of the organ 520 by conveying a temperature control material through the tube 505. In one examples, a bag of cold saline may be switched with a bag of pre-warmed saline (with or without insulation) to control the temperature of the organ 520. In some examples, the temperature control unit 510 heats the temperature control material, where controlling the temperature of the organ 520 includes increasing the temperature of the organ 520. In some examples, the temperature control unit 510 cools the temperature control material, where controlling the temperature of the organ 520 includes decreasing the temperature of the organ 520.

According to some embodiments, temperature control unit 510 is configured to control the temperature of an organ 520 by cooling or heating a temperature control material, or by controlling a flow rate of the temperature control material.

The circulation component 515 is a device used to move gasses or liquids in a controlled manner using mechanical methods. For example, the circulation component 515 may be a pump such as a hydraulic pump, a screw pump, or a piston pump. Additionally, the circulation component 515 may be gravity fed or manually fed through the tube 505. In some cases, a circulation component 515 uses electrical energy to recirculate fluid through the tube 505.

According to some embodiments, circulation component 515 is configured to convey a temperature control material through the tube 505, wherein the temperature control material comprises a liquid or a gas. In some examples, the circulation component 515 includes an elevated reservoir for the temperature control material, where the temperature control material is drawn through the tube 505 by gravity. In some examples, the circulation component 515 includes a pump.

According to some embodiments, circulation component 515 adjusts a flow of the temperature control material based on the temperature (automatically or manually) and conveys a temperature control material through the tube 505, where the temperature control material includes a liquid or a gas.

Organ 520 may be any human or animal organ suitable for transplant from a donor to a host. For example, the organ 405 may be a kidney, heart, liver, lung, or the like. In some cases, the organ 405 may be removed from a donor and imminently placed into the organ supporting apparatus for suitable maintenance of temperature. Organ 520 is an example of, or includes aspects of, the corresponding element described with reference to FIGS. 2-4.

The temperature sensor 525 detects a temperature of the fluid, the organ 520, or both. In some cases, the sensor may be a transmission fluid temperature (TFT) sensor, a thermistor, a resistance temperature detector, a thermocouple, or a semiconductor-based temperature sensor 525, but the present disclosure is not limited thereto. In some cases, the temperature sensor 525 may an organ temperature sensor 525. The organ temperature sensor 525 detects the temperature of the organ 520 and may detect the surface temperature, core (inner) temperature, or a combination of the surface and core temperature of the organ 520. The surface organ temperature sensor 525 may be a sensor such as a thermocouple or an infrared sensor. The core organ temperature sensor 525 may be a sensor such as a probe, but the present disclosure is not limited to these examples. According to some embodiments, temperature sensor 525 is configured to sense a temperature of the temperature control material, a temperature of an organ 520, or both. In some embodiments, more than one temperature sensor may be used.

In an alternative embodiment, the tube 505 of the organ supporting apparatus 500 may include two or more temperature sensors 525 to sense temperature at different locations. For example, the temperature control unit 510 may receive, as input, one temperature from one temperature sensor 525 of the tube 505 to adjust the temperature of the temperature control material. In another example, the temperature control unit 510 may receive, as input, two sensed temperatures from two temperature sensors 525 and adjust the temperature of the temperature control material based on a differential temperature between the two sensed temperatures.

According to some embodiments, the organ supporting apparatus 500 of the present disclosure may perform similarly to a surgical retraction device. For example, the surgical retraction device of the present disclosure may be configured to retract, advance, or manipulate the organ supporting apparatus 500 within a surgical area. In some cases, the organ supporting apparatus 500 may attach to a secondary surgical retraction device such as Bookwalter retractor, an Omni-tract retractor, or a Thompson retractor.

According to some embodiments, tube 505 supports the organ 520 using a first supporting region, a second supporting region separated from the first supporting region in a first direction, and a connecting region connecting the first region and the second region. Additionally, or alternatively, the tube 505 includes a first set of bends in the first supporting region of the tube 505, where the first set of bends are separated from each other in a second direction perpendicular to the first direction, and where the tube 505 includes a second set of bends in the second supporting region tube 505. The second set of bends may be separated from each other in the first direction. In some examples, tube 505 may act as a surgical retraction device to manipulate the organ 520 being supported by the organ supporting apparatus 500.

According to some embodiments, tube 505 provides a tube 505 including a first supporting region, a second supporting region, and a connecting region. In some examples, tube 505 separates the first supporting region from the second supporting region in a first direction by bending the tube 505. In some examples, tube 505 forms a first set of bends in the first supporting region of the tube 505, where the first set of bends are separated from each other in a second direction perpendicular to the first direction. In some examples, tube 505 forms a second set of bends in the second supporting region tube 505, where the second set of bends are separated from each other in the first direction.

Figure 6:
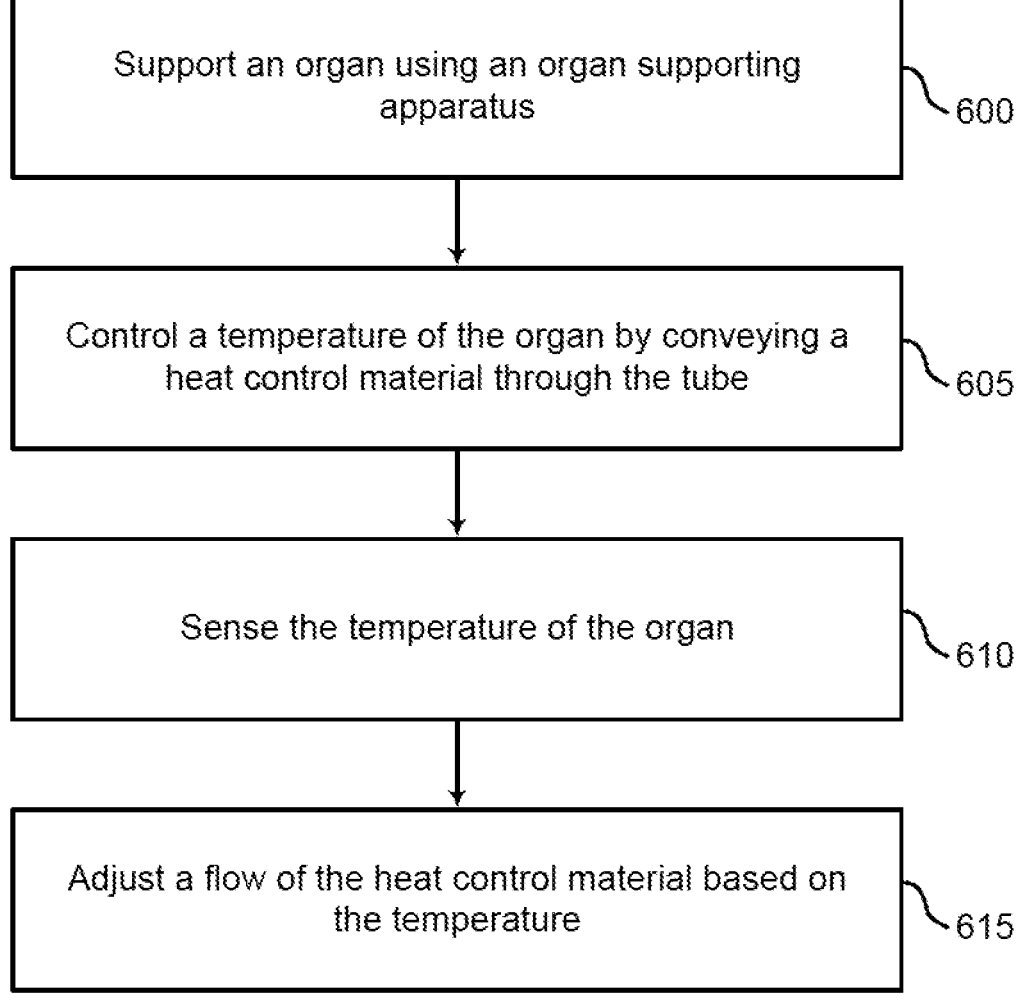

FIG. 6 shows an example of a process for organ temperature control according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system supports an organ using an organ supporting apparatus including a tube with a first supporting region, a second supporting region separated from the first supporting region in a first direction, and a connecting region connecting the first region and the second region, where the tube includes a first set of bends in the first supporting region of the tube, where the first set of bends are separated from each other in a second direction perpendicular to the first direction, and where the tube includes a second set of bends in the second supporting region tube, where the second set of bends are separated from each other in the first direction. In some cases, the operations of this step refer to, or may be performed by, a tube as described with reference to FIG. 5.

At operation 605, the system controls a temperature of the organ by conveying a temperature control material through the tube. The temperature control material may be a liquid or a gas. The temperature control material uses heat transfer properties to add or remove heat from an organ. In some cases, the operations of this step refer to, or may be performed by, a temperature control unit as described with reference to FIG. 5.

At operation 610, the system senses the temperature of the organ using a temperature sensor. The sensed temperature is provided to the temperature control unit or the circulation component. In some cases, the sensor may be a transmission fluid temperature (TFT) sensor, a thermistor, a resistance temperature detector, a thermocouple, or a semiconductor-based temperature sensor, but the present disclosure is not limited thereto. In some cases, the temperature sensor may detect the surface temperature, core (inner) temperature, or a combination of the surface or core of the organ. The surface organ temperature sensor may be a sensor such as thermocouple or infrared. The core organ temperature sensor may be a sensor such as probe, but the present disclosure is not limited to these examples. In some cases, the operations of this step refer to, or may be performed by, a temperature sensor as described with reference to FIG. 5.

At operation 615, the system adjusts a flow or temperature of the temperature control material based on the temperature. The flow may be increased and decreased to provide automatic temperature control. Additionally, or alternatively, the system may adjust the temperature of temperature control material to provide automatic (or manual) temperature control. In some cases, the operations of this step refer to, or may be performed by, a circulation component as described with reference to FIG. 5.

Manufacturing

A method, apparatus, and system for organ temperature control are described. One or more embodiments of the method, apparatus, and system include providing a tube comprising a first supporting region, a second supporting region, and a connecting region, separating the first supporting region from the second supporting region in a first direction by bending the tube, forming a first plurality of bends in the first supporting region of the tube, wherein the first plurality of bends are separated from each other in a second direction perpendicular to the first direction, and forming a second plurality of bends in the second supporting region tube, wherein the second plurality of bends are separated from each other in the first direction.

Some examples of the method, apparatus, and system described above further include providing a circulation component configured to convey a temperature control material through the tube, wherein the temperature control material comprises a liquid or a gas.

Some examples of the method, apparatus, and system described above further include providing a temperature control unit configured to control the temperature of an organ by cooling or heating a temperature control material, or by controlling a flow rate of the temperature control material.

FIG. 7 shows an example of a process for organ temperature control according to aspects of the present disclosure. In some examples, these operations are performed by a system including a processor executing a set of codes to control functional elements of an apparatus. Additionally, or alternatively, certain processes are performed using special-purpose hardware. Other aspects of the method may be performed manually. Generally, these operations are performed according to the methods and processes described in accordance with aspects of the present disclosure. In some cases, the operations described herein are composed of various substeps, or are performed in conjunction with other operations.

At operation 700, the manufacturing system provides a tube including a first supporting region, a second supporting region, and a connecting region. The first supporting region and the second supporting region may be a collection of bends used to provide support or cover the organ during transportation or surgery. The connecting region is the area between the first and second supporting region, connecting the first and second supporting regions. In some cases, the operations of this step refer to, or may be performed by, a tube as described with reference to FIG. 5.

At operation 705, the manufacturing system separates the first supporting region from the second supporting region in a first direction by bending the tube, forming the connecting region. In some cases, the operations of this step refer to, or may be performed by, a tube as described with reference to FIG. 5.

At operation 710, the 'manufacturing system forms a first set of bends in the first supporting region of the tube, where the first set of bends are separated from each other in a second direction perpendicular to the first direction. In some cases, the operations of this step refer to, or may be performed by, a tube as described with reference to FIG. 5.

At operation 715, the 'manufacturing system forms a second set of bends in the second supporting region tube, where the second set of bends are separated from each other in the first direction. In some cases, the operations of this step refer to, or may be performed by, a tube as described with reference to FIG. 5.

It will be obvious to those skilled in the art to understand that the formation of the connecting region and the formation of the bends may be interchangeably manufactured. For example, the process may form the first and second set of bends prior to forming the connecting region.

At operation 720, the 'manufacturing system provides a circulation component configured to convey a temperature control material through the tube, where the temperature control material includes a liquid or a gas. In some cases, the operations of this step refer to, or may be performed by, a circulation component as described with reference to FIG. 5.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. An organ supporting apparatus comprising:
a tube comprising a first supporting region, a second supporting region separated from the first supporting region in a first direction, and a connecting region connecting the first supporting region and the second supporting region, wherein the tube comprises a single tube shape forming the first supporting region, the second supporting region, and the connecting region, wherein the tube comprises a thermally conductive metal configured to hold an organ without additional supporting material in the first supporting region, the second supporting region, and the connecting region;
a first plurality of bends in the first supporting region of the tube, wherein the first plurality of bends are separated from each other by an air gap in a second direction perpendicular to the first direction, and wherein each of the first plurality of bends extends from a first side of the apparatus in the first direction on a lower side of the apparatus to form a first organ supporting region;
a second plurality of bends in the second supporting region of the tube, wherein the second plurality of bends are separated from each other by an air gap in the second direction, and wherein each of the second plurality of bends extends from a second side of the apparatus opposite to the first side in a direction opposite to the first direction on the lower side of the apparatus to form a second organ supporting region; and
a circulation component configured to convey a temperature control material through the tube, wherein the temperature control material comprises a liquid or a gas.

2. The apparatus of claim 1, wherein:

the first supporting region and the second supporting region are configured to support the organ between the first supporting region and the second supporting region when the first supporting region and the second supporting region are pressed together in the first direction.

3. The apparatus of claim 1, wherein:

the circulation component comprises an elevated reservoir for the temperature control material, wherein the temperature control material is drawn through the tube by gravity.

4. The apparatus of claim 1, wherein:

the circulation component comprises a pump.

5. The apparatus of claim 1, further comprising:

a handle region of the tube configured to support a weight of the first supporting region and the second supporting region and to convey a force pressing the first supporting region and the second supporting region together in the first direction.

6. The apparatus of claim 1, wherein:

the tube is formed from a material having a Young's modulus greater than 10 GPa.

7. The apparatus of claim 1, wherein:

the tube is formed from a material with a thermal conductivity greater than 0.1 W/mK.

8. The apparatus of claim 1, wherein:

the apparatus is configured to provide visibility between the first plurality of bends to the organ being supported by the apparatus.

9. The apparatus of claim 1, further comprising:

a temperature control unit configured to control a temperature of the organ by cooling or heating the temperature control material, or by controlling a flow rate of the temperature control material.

10. The apparatus of claim 1, further comprising:

a temperature sensor configured to sense a temperature of the temperature control material, a temperature of the organ, or both.

11. The apparatus of claim 1, further comprising:

a surgical retraction device configured to retract, advance, or manipulate the organ the apparatus within a surgical area.

12. The apparatus of claim 1, wherein:

the tube is sufficiently rigid to support a weight of a kidney without additional supporting material.

13. The apparatus of claim 1, wherein:

each of the first plurality of bends connects a first portion of the tube and a second portion of the tube, wherein the first portion of the tube is separated from the second portion of the tube by an air gap.

14. The apparatus of claim 1, wherein:

the circulation component causes the temperature control material to flow through an entire length of the tube from the first supporting region to the connecting region and from the connecting region to the second supporting region.

15. The apparatus of claim 1, further comprising:

a disposable wrapping attached to the apparatus, wherein the disposable wrapping is configured to prevent direct contact between the apparatus and the organ.

16. The apparatus of claim 9, wherein:

the temperature control unit comprises at least one of a liquid-to-liquid system, a closed-loop dry system, an open-loop evaporative system, a closed-loop evaporative system, or a chilled water system.

* * * * *